United States Patent
Van Brocklin et al.

(10) Patent No.: US 7,364,780 B2
(45) Date of Patent: Apr. 29, 2008

(54) THERMALLY-SENSITIVE MEDIUM WITH FABRY-PEROT CAVITIES

(76) Inventors: Andrew L. Van Brocklin, 6050 NW. Happy Valley Dr., Corvallis, OR (US) 97330; Timothy F. Myers, 30862 Peterson Rd., Philomath, OR (US) 97370

( * ) Notice: Subject to any disclaimer, the term of this patent is extended or adjusted under 35 U.S.C. 154(b) by 495 days.

(21) Appl. No.: 11/007,768

(22) Filed: Dec. 8, 2004

(65) Prior Publication Data

US 2006/0122058 A1   Jun. 8, 2006

(51) Int. Cl.
*B32B 3/02* (2006.01)
(52) U.S. Cl. ............... 428/64.1; 428/64.8; 430/270.14; 503/200
(58) Field of Classification Search ............... 428/64.1, 428/64.8; 430/270.14; 503/200
See application file for complete search history.

(56) References Cited

U.S. PATENT DOCUMENTS

| | | |
|---|---|---|
| 5,371,698 A | 12/1994 | Koehler et al. |
| 5,925,433 A | 7/1999 | Dubbeldam |
| 6,174,836 B1 | 1/2001 | Hotta et al. |
| 6,695,905 B2 | 2/2004 | Rozumek et al. |
| 2003/0161224 A1 | 8/2003 | Anderson et al. |
| 2003/0179679 A1 | 9/2003 | Morishima |

OTHER PUBLICATIONS

International Search Report for Application No. PCT/US2005/038515. Report issued Mar. 31, 2006.

*Primary Examiner*—Milton I. Cano
*Assistant Examiner*—David J. Joy

(57) ABSTRACT

A medium includes a plurality of Fabry-Perot cavities of varying depths. The cavities correspond to different colors which are produced by the respective cavities under incident light. A thermo-sensitive material covers the plurality of cavities. The cavities are selectively exposed by heating portions of said thermo-sensitive material to alter the thermo-sensitive material where heated thereby forming an image.

35 Claims, 7 Drawing Sheets

THERMALLY-SENSITIVE MEDIUM WITH FABRY-PEROT CAVITIES

BACKGROUND

Digital imaging media for multiple applications is in high demand. The advent of digital technology has allowed individuals to create digital images. These same individuals desire to produce color copies of these digital images. This desire has created a pent-up demand for small, low powered, and simple imaging devices. In order to reduce the complexity of the printing mechanisms for these devices, it is desirable to reduce the need for bulky cartridges or ribbons which place mechanical constraints on the printing mechanisms. Several different imaging technologies such as cell phones, cameras, and personal data assistants use digital media to store images. These technologies are small handheld devices and there is a need to provide a printing medium that produces high quality color images from them and also to provide for unique labeling of the digital medium.

Other digital media such optical discs have fast become an industry standard for data storage in the fields of computers, video, and music. Optical discs include, but are not limited to, compact discs (CDs), digital video (or versatile) discs (DVDs), and game system discs in a variety of formats. Commercially produced optical discs typically have digital data recorded on one side of the disc and a visual display, or a label printed or formed on the other side of the disc.

Some optical discs have been created that can store data on both sides of the disc. However, in many cases it is desirable to limit the optical disc data to a single side of the disc, leaving the other side of the disc for printed text, patterns, or graphics. The printed labeling on a non-data side of an optical disc can include images such as a decorative design, text identifying the data stored on the disc, or both.

As optical technology has advanced, writeable and re-writable optical discs, as well as equipment for writing data onto the discs, have become reasonably priced and within the grasp of ordinary consumers. Thus, many consumers currently have the ability to burn data onto optical discs with home or office computers that have optical disc drives. For example, consumers may, in some instances, purchase CD or DVD data from a website on the Internet and burn the data onto their own CD or DVD. Many such consumers also then desire the capacity to print or form a label on the other side of the disc as a professionally produced disc would have.

Therefore, it is desirable to have an imageable medium that allows for low cost printing from handheld devices as well as the labeling of the digital medium itself.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

The present specification describes media and methods of making such media in which Fabry-Perot devices are formed to reflect one of three or more different colors. The Fabry-Perot devices are covered with a thermally sensitive material to allow for selective exposure. When an image is desired, the devices are then selectively thermally exposed so as to form a color image on the medium. For example, the laser of an optical pickup can be used to selectively block or expose the Fabry-Perot devices to view and thus, write the desired color image onto the medium.

One exemplary application of these principles is to an optical disc. As noted above, optical discs are frequently used to store massive amounts of data; video data, audio data and computer data. It is also often the case that a user would desire to form a color image or label on the non-data bearing side of the disc (100). However, the principles are applicable to medium used to form color photographs such as by applying the manufacturing techniques illustrated to non-disc (such as rectangular) media. Further, digital media such as compact flash cards may have a surface covered with medium that encompasses the selectively exposable Fabry-Perot devices to allow for labeling of the media. The optical disc example is shown because the optical components and system are well known to those of skill in the art and are easily adapted to allow for use in non-rotational systems.

Figure 1:
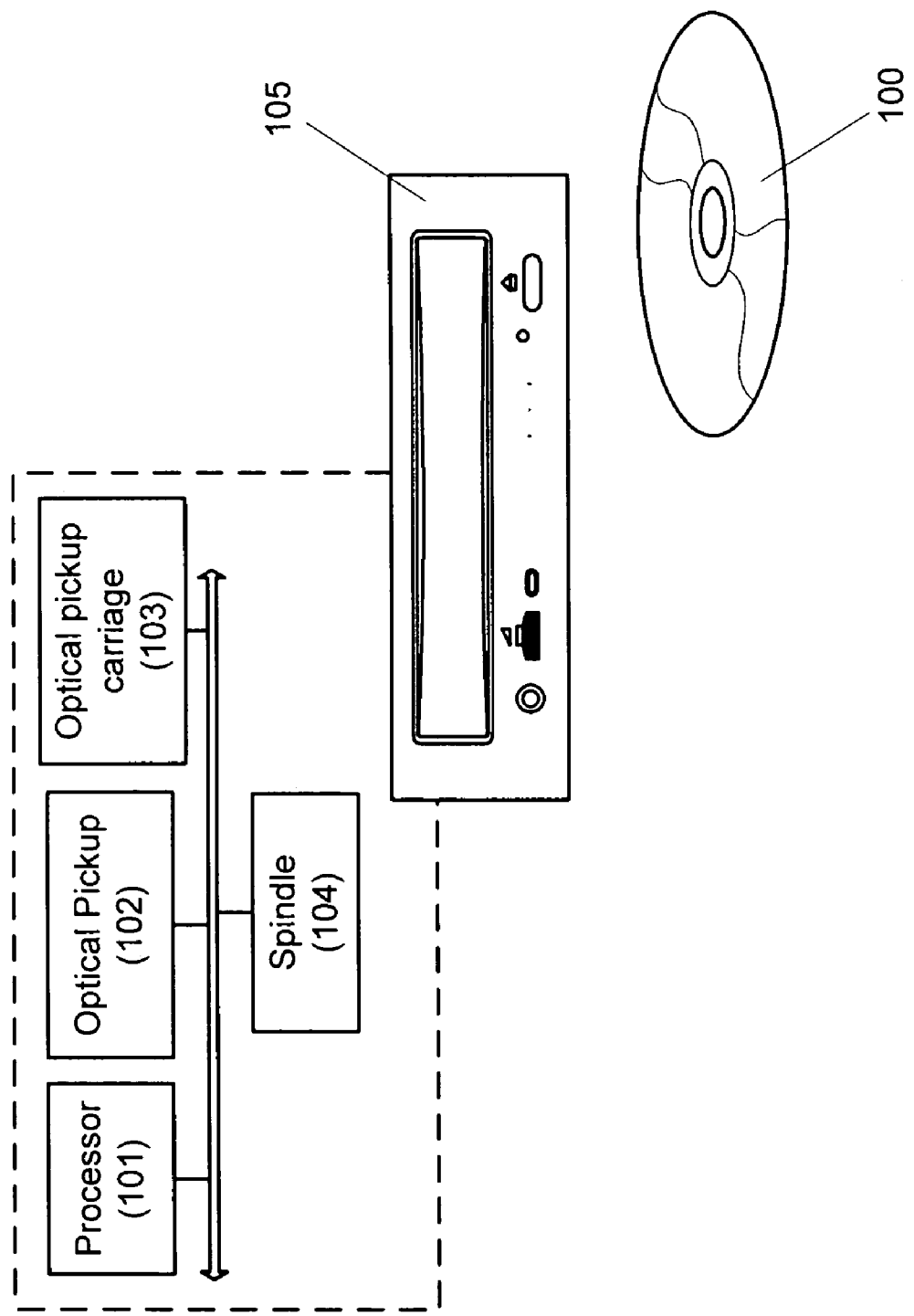
FIG. 1 illustrates an exemplary system for forming a color label on an optical disc according to principles described herein.

FIG. 1 illustrates an exemplary system for forming a color label on an optical disc according to principles described herein. As shown in FIG. 1, an optical drive (105) also includes the components for writing data to an optical disc (100). The optical drive (105) may be connected to, or integrated with, a computer. It may also be a separate component in, for example, a home entertainment system.

During data writing or reading, the optical disc (100) is placed in the drive (105) with a data-bearing side being presented to the optical pickup (102) of the drive (105). As will be known to those skilled in the art, the optical pickup (102) includes a tightly focused laser that, at high intensity, can selectively change the optical properties of small portions of the disc. In this way, data is written to the disc (100). Used with less intensity, the same laser can then read the data from the disc (100) as the pattern on the disc (100) selectively reflects or does not reflect the less intense laser.

A spindle (104) rotates the disc (100) and a carriage (103) moves the optical pickup radially over the disc (100). In this way, the spindle (104) and the carriage (103) can create a spiral track that covers the entire useable surface of the disc (100) and is accessible to the optical pickup (102).

A processor (101) coordinates the operation of the other elements of the drive (105). When data is to be written to the disc (100), that data is received by the processor (101). The processor (101) then selectively controls the intensity and modulation of the laser of the optical pickup (102) to write the data to the disc (100).

Under principles described herein, the same drive (105) can be used to form a color label on a specially-prepared disc (100). To do this, the disc (100) is turned over or the disc (100) is placed in the drive (105) such that a label side, as opposed to the data-bearing side, is presented to the optical pickup (102).

In a manner that will be described in more detail below, the laser of the optical pickup (102) is then used to selectively expose Fabry-Perot devices on the disc (100) that reflect one of several different colors when exposed to incident light. By controlling which Fabry-Perot devices are exposed to view, the optical pickup can thus create a color image on the label side of the disc (100). Alternatively, or in addition, isolated portions of the data or label side of the disc may also include areas of Fabry-Perot devices. For instance, a two sided disc may contain an inner portion that allows for digital data to be stored, and an outer portion that allows for labeling of that side of the disc.

Figure 2:
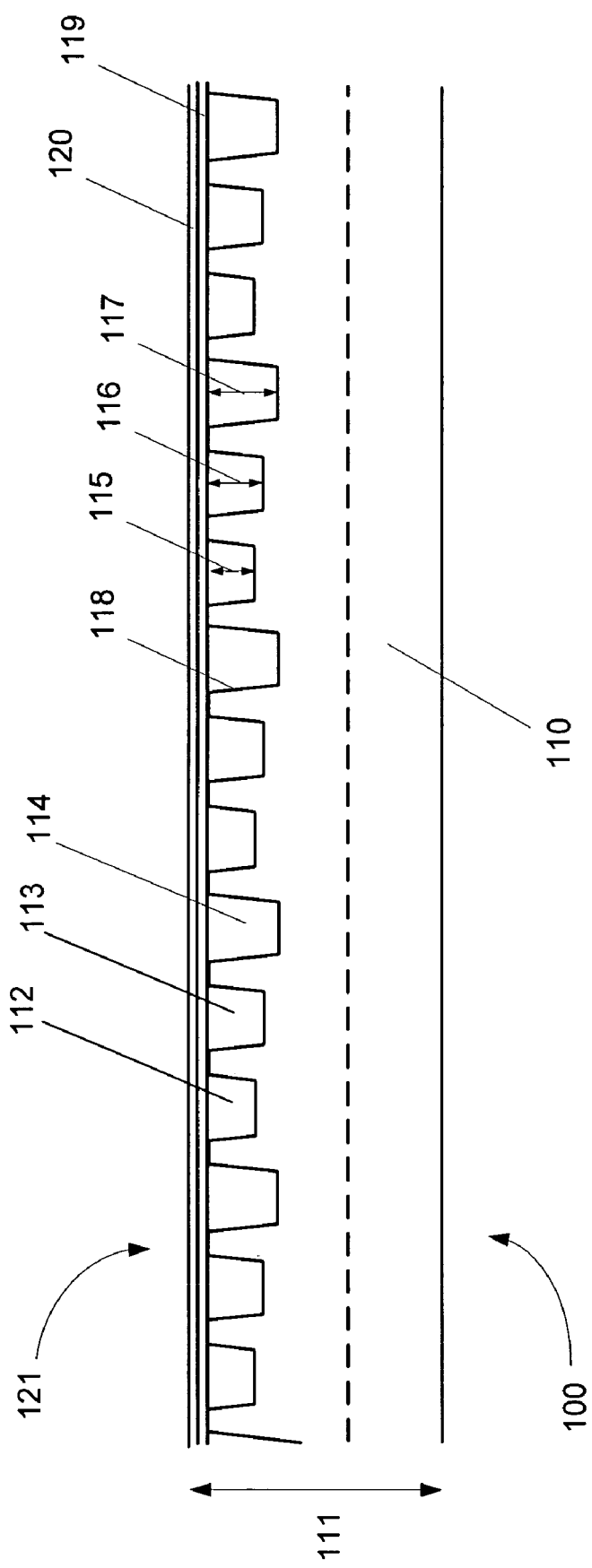
FIG. 2 illustrates an exemplary optical disc according to principles described herein.

FIG. 2 illustrates an exemplary optical disc according to principles described herein. As shown in FIG. 2, the optical disc (100) has a data-bearing side (110) and an opposite label side (121). The data-bearing side (110) is well known in the art and will not be described further. The thickness (111) of the disc may be, for example, 1.2 mm.

A series of Fabry-Perot cavities (112, 113, 114) are then formed in the disc. These cavities will have varying depths. The depth of the cavity will determine the color produced by the Fabry-Perot Effect when incident light shines on that cavity.

Thus, if cavities are provided at three different depths, representing three basic colors, a full-color image can be produced by selectively exposing the different Fabry-Perot devices (112, 113, 114) to view. In some examples, the Fabry-Perot cavities (112, 113, 114) may be tuned to produce Red, Blue and Green. In other examples, the cavities (112, 113, 114) may be tuned to produce Orange-red, Yellow-green and purple (or violet). As will be understood by those in the art, with the benefit of this disclosure, there may be other color combinations of three or more colors that may be used to produce the image on the disc (100). Each color will correspond to Fabry-Perot cavities of a specific depth. In addition, a black cavity may be included. A black cavity for instance may have a depth of about 600 Angstroms. A black cavity essentially absorbs most incident light, allowing for a perceived black state.

In the illustrated example, three different depths are used to provide Red, Blue and Green picture elements. For example, Fabry-Perot devices that produce a Red color (112) will have a depth (115) of 3000 Å. Deeper Fabry-Perot devices that produce a second order Blue color (113) will have a depth (116) of 3800 Å. Still deeper Fabry-Perot devices that produce a second order Green color will have a depth (117) of 4800 Å. First order Blue and Green Fabry-Perot devices would have depths of 1600 Å and 2200 Å, respectively for each respective cavity.

The Fabry-Perot cavities (112, 113, 114) are coated with a reflective material (118), such as aluminum. Then, a layer (119) of partially-reflective material is formed over all the Fabry-Perot devices (112, 113, 114). This layer (119) may be made, for example, of tantalum and aluminum (TaAl) at a thickness of 75 Å.

Thus, each Fabry-Perot device (112, 113, 114) becomes a reflective cavity, coated with, for example, aluminum. Incident light enters the Fabry-Perot cavity through the upper, partially-reflective layer (119). The light then undergoes multiple reflections between the top and bottom of the cavity. This causes the light to interfere with itself many times. One frequency will experience constructive interference, while all other frequencies experience destructive interferences. The frequency that experiences constructive interferences, the color produced by that Fabry-Perot cavity, will depend on the depth of the cavity being such that a standing wave of the desired frequency can form through constructive interference.

The condition for constructive interference within a Fabry-Perot device is that the light forms a standing wave between the top and bottom of the cavity. In other words, the optical distance between the top and bottom of the cavity must equal an integral number of half wavelengths of the desired color. The constructive interference condition therefore is defined by the equation:

$$nd\cos\theta = m\lambda/2$$

where m is an integer termed the order (usually first (m=1) or second (m=2)) of interference, n is the refractive index of the medium (e.g., air) between reflective surfaces of the cavity, d is the cavity depth and θ is the inclination of the direction of the incoming radiation to the normal of the disc (100). Because air (n=1) typically is the medium in the Fabry-Perot cavities (112, 113, 114), and the incident light usually is aligned normal to the disc (100) (cos θ=1), the constructive interference equation can be reduced to:

$$d = m\lambda/2$$

thus giving us a simple relationship between the depth of the cavity and the wavelength or color produced by that cavity. In one embodiment, the cavity may be formed with a material having refractive index n that is different than air in order to adjust the depth of the cavities.

Finally, a thermo-sensitive or optically-sensitive layer (120) is applied over the partially reflective layer (119). This layer (120) will reversibly change its optical properties when exposed to a laser or other optical device with sufficient energy or wavelengths. In one example, the layer (120) is, at first, a milky, opaque white. Where the layer (120) is exposed to a laser, such as the laser of the optical pickup (102, FIG. 1), the layer turns clear and transparent. In this way, the laser of the optical pickup (102, FIG. 1) can selectively expose to view the desired Fabry-Perot devices (112, 113, 114) to form colored pixels of a desired disc label. When incident light is then able to enter the exposed Fabry-Perot devices, the corresponding colors are seen and, collectively, form and display the desired image. Alternatively, the sensitive layer may be substantially transparent and when exposed to the laser, the layer turns white, black, or otherwise opaque, thus blocking the Fabry-Perot device. Thus, the sensitive layer (120) may be imageable in a positive or negative manner. In addition, the blocking color is preferably white, but may be black to improve contrast in some applications.

As with writing data to the disc (100), the processor (101, FIG. 1) can receive data defining the image to be produced on the label side (121) of the disc (100). The processor (101, FIG. 1) then selectively drives the optical pickup (102), spindle (104) and carriage (103) to position and expose the Fabry-Perot devices (112, 113, 114) at the locations needed to form the color image represented by the received data. Where the Fabry-Perot devices are not exposed, i.e., the thermo-sensitive or laser-sensitive layer (120) is not exposed to the laser light of the pickup (102, FIG. 1), the layer (120) remains white and opaque.

An example of the material for the thermo-sensitive or optically-sensitive layer (120) described herein is explained in detail in U.S. Pat. No. 6,174,836 to Hotta et al., issued Jan. 16, 2001, entitled "Reversible Thermosensitive Recording Medium, Method of Producing the Medium, Information Recording Devices Using the Medium, and Image Formation and Erasing Method using the Medium," which patent is incorporated herein by reference in its entirety. Using such a material allows for the medium to be reimagable. Thus, the image formed may be erased and a new image recreated with the media. Other thermo or optically-sensitive material are described in detail in commonly assigned patent publication 2003108708A1, filed Oct. 11, 2001 entitled "Integrated CD/DVD Recording and Labeling," which is incorporated herein by reference in its entirety and commonly assigned patent publication 20030222965A1, filed May 31, 2002, entitled "Method and Materials for Entitling Compact Discs," which is incorporated herein by reference in its entirety.

Figure 3:
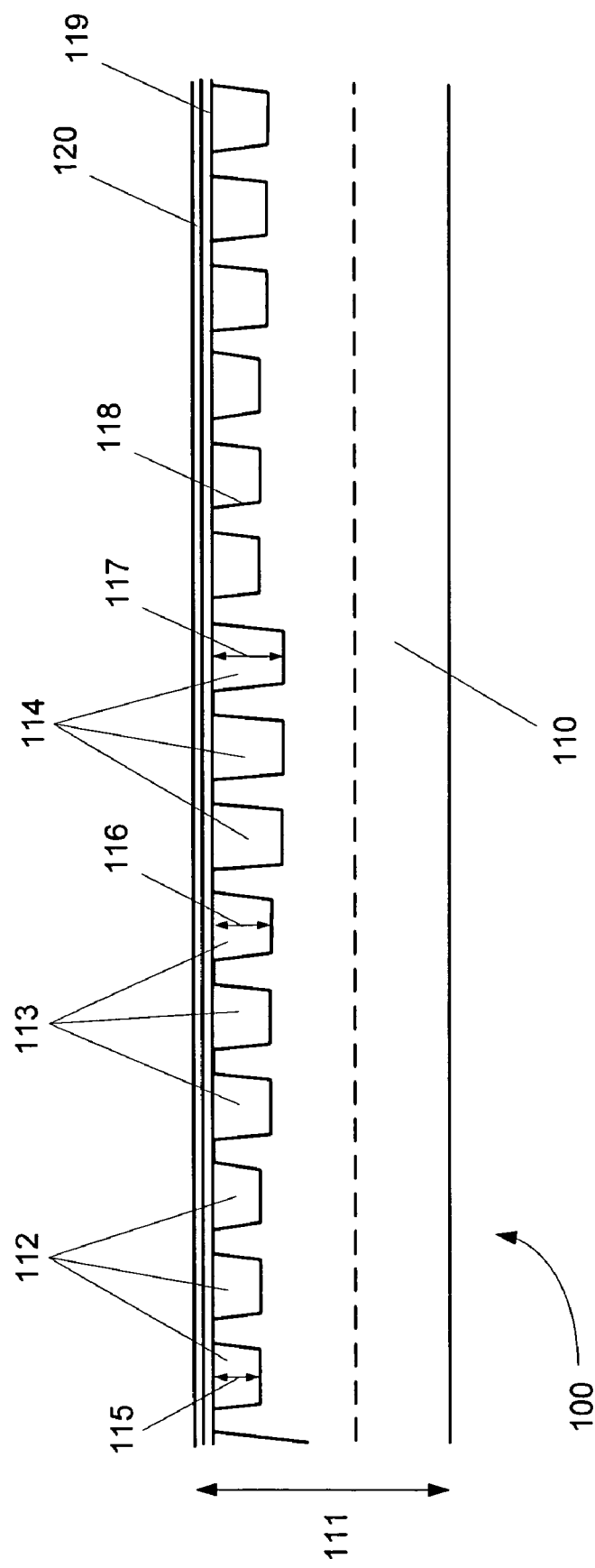
FIG. 3 illustrates another exemplary optical disc according to principles described herein.

FIG. 3 illustrates another exemplary optical disc according to principles described herein. The configuration of the disc (130) shown in FIG. 3 is very similar to the disc (100) shown in FIG. 2. The principal difference is the arrangement of the Fabry-Perot cavities of varying depths. In FIG. 2, each successive cavity has a different depth, with three depths corresponding to three colors repeating over and over. Generally, this layout would correspond to a relatively small pixel size and higher resolution in the resulting image.

FIG. 3 illustrates a different configuration, in which, for example, three cavities (112) are formed in succession at the same depth (115). Then another three cavities (113) are formed at a next depth (116). Finally, three cavities (114) are formed at the deepest depth (117). The pattern then repeats every nine cavities. Generally, this layout configuration would correspond to relatively larger pixel size and lower resolution in the resulting image, but each larger pixel could be created out of smaller sub-pixels which allows the optical or thermal energy to be more concentrated during image formation.

Figure 4:
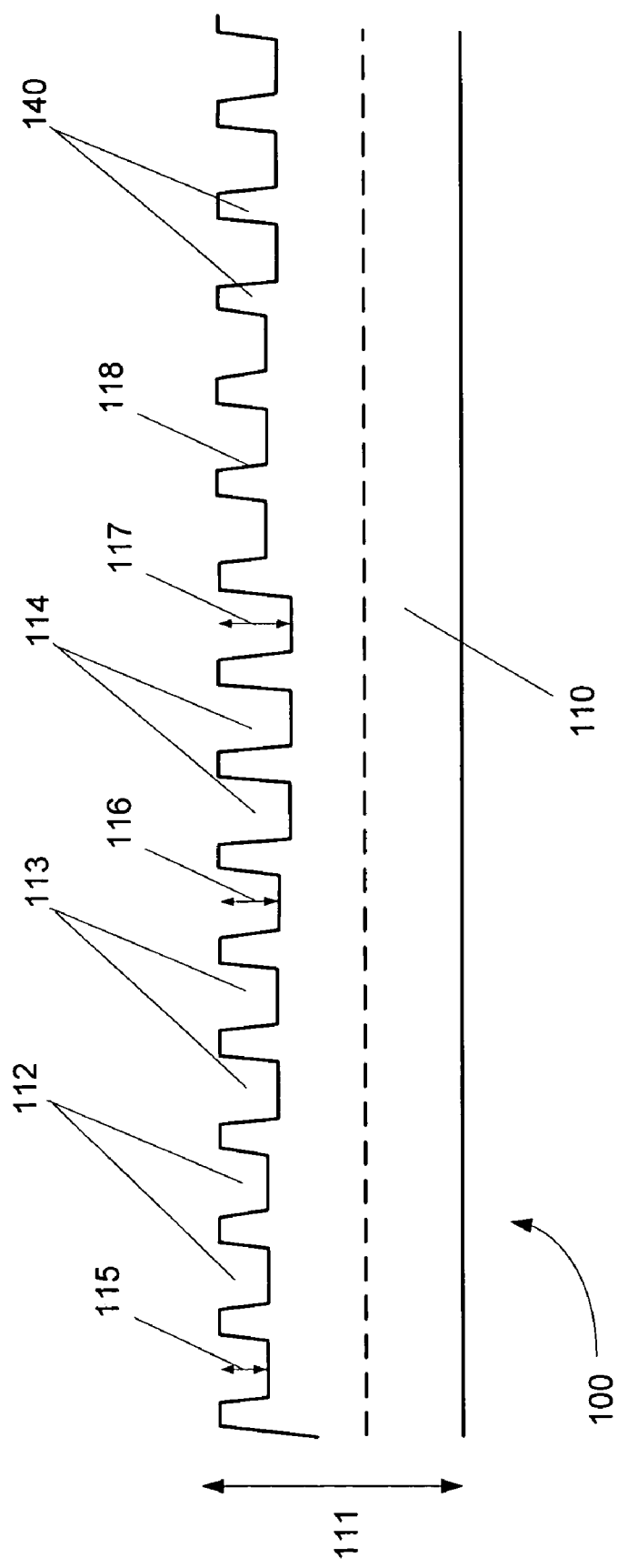
FIGS. 4-6 illustrate various steps in the formation of the optical discs of, for example, FIGS. 2 and 3, according to principles described herein.
Figure 5:
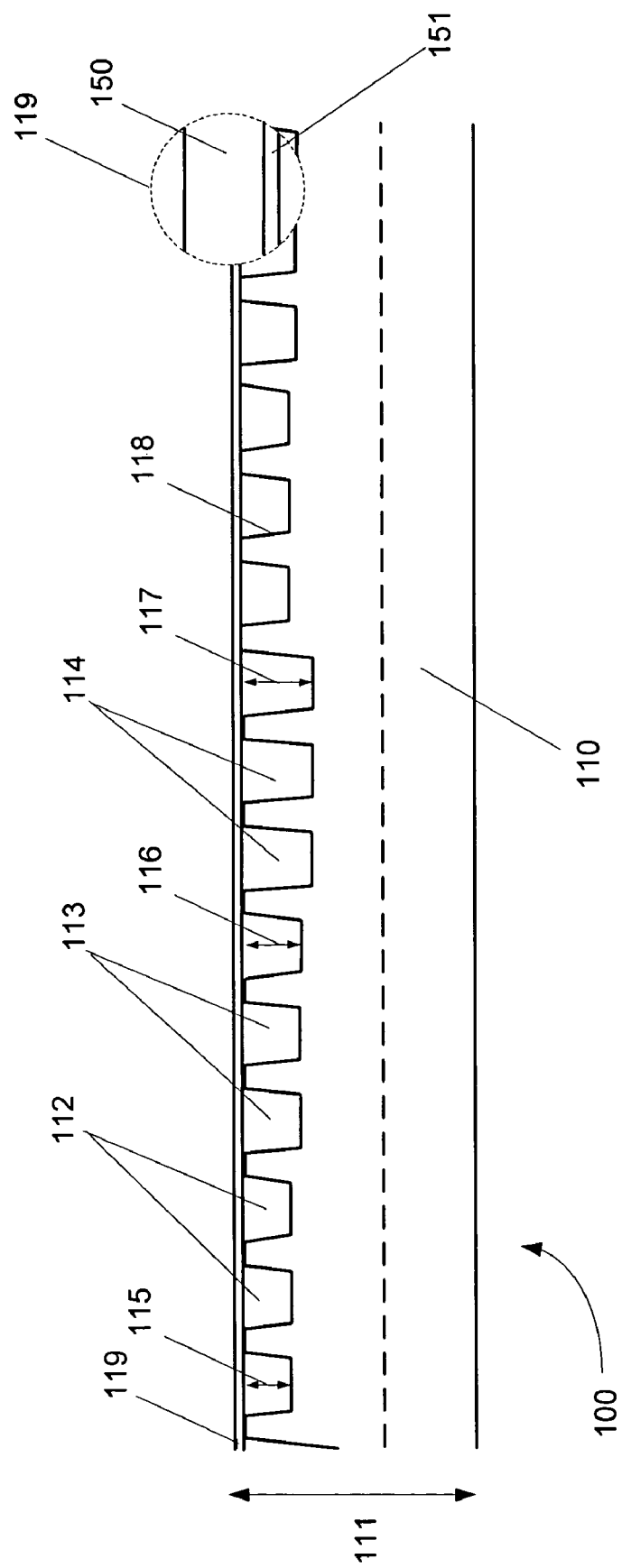
Figure 6:
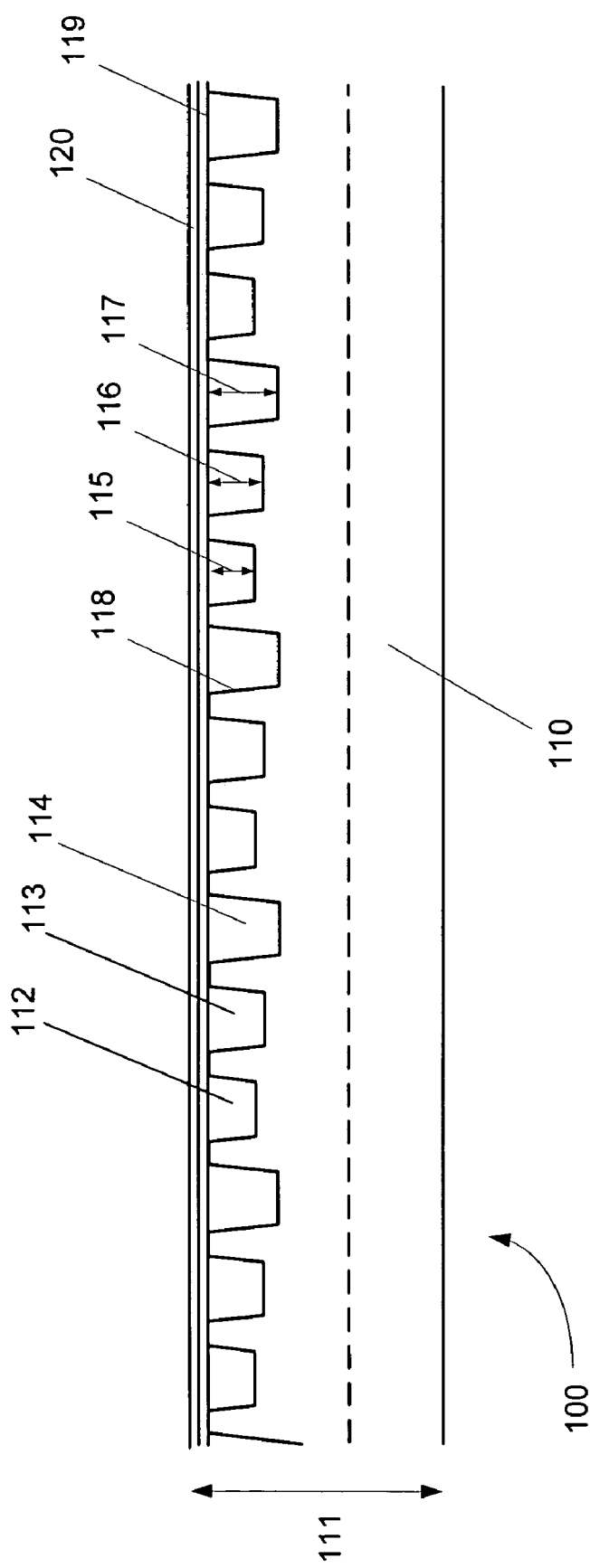

FIGS. 4-6 illustrate various steps in the formation of the optical discs of, for example, FIGS. 2 and 3, according to principles described herein. The media may also be of any shape such as rectangular for photo media. As shown in FIG. 4, the desired pattern of Fabry-Perot cavities (112, 113, 114) may be stamped into the material of the disc (100). This material is typically polycarbonate. The stamping thus produces support ribs (140) made of, for example, polycarbonate, that support and define the sides of each Fabry-Perot cavity. This can be accomplished using the same precision stamping process that forms pits and pre-grooves for the data-bearing side (110) of the disc (100).

Next, a layer of reflective material (118) is applied in all the cavities (112, 113, 114). This reflective material may be, for example, aluminum and acts as a mirror to reflect incident light to produce the standing wave of desired frequency and color according to the Fabry-Perot Effect.

As shown in FIG. 5, a partially-reflective layer (119) is then formed over the Fabry-Perot cavities (112, 113, 114). As shown in the inset in FIG. 5, this layer (119) actually has two components. First, a partially-reflective layer (151) is formed of, for example, tantalum and aluminum (TaAl) at a thickness of 75 Å. This layer (151) allows incident light into the underlying Fabry-Perot cavity, reflects light within the cavity to produce the standing wave of the desired color using the Fabry-Perot Effect and allows light of the desired color to be emitted from the Fabry-Perot device.

Over the partially-reflective layer (151), a stiffening layer (150) is formed. This stiffening layer (150) may be, for example, greater than 2 µm in thickness and formed of transparent polycarbonate. The stiffening layer (150) and partially-reflective layer (151) are supported on the support ribs and provide mechanical strength to the label side of the disc (100).

As shown in FIG. 6, the last step is the application of the thermo-sensitive layer (120) that can be selectively rendered transparent to expose the color of the underlying Fabry-Perot devices (112, 113, 114) to form a desired image or label. The label formed can include any elements, for examples, graphics, text, etc.

Figure 7:
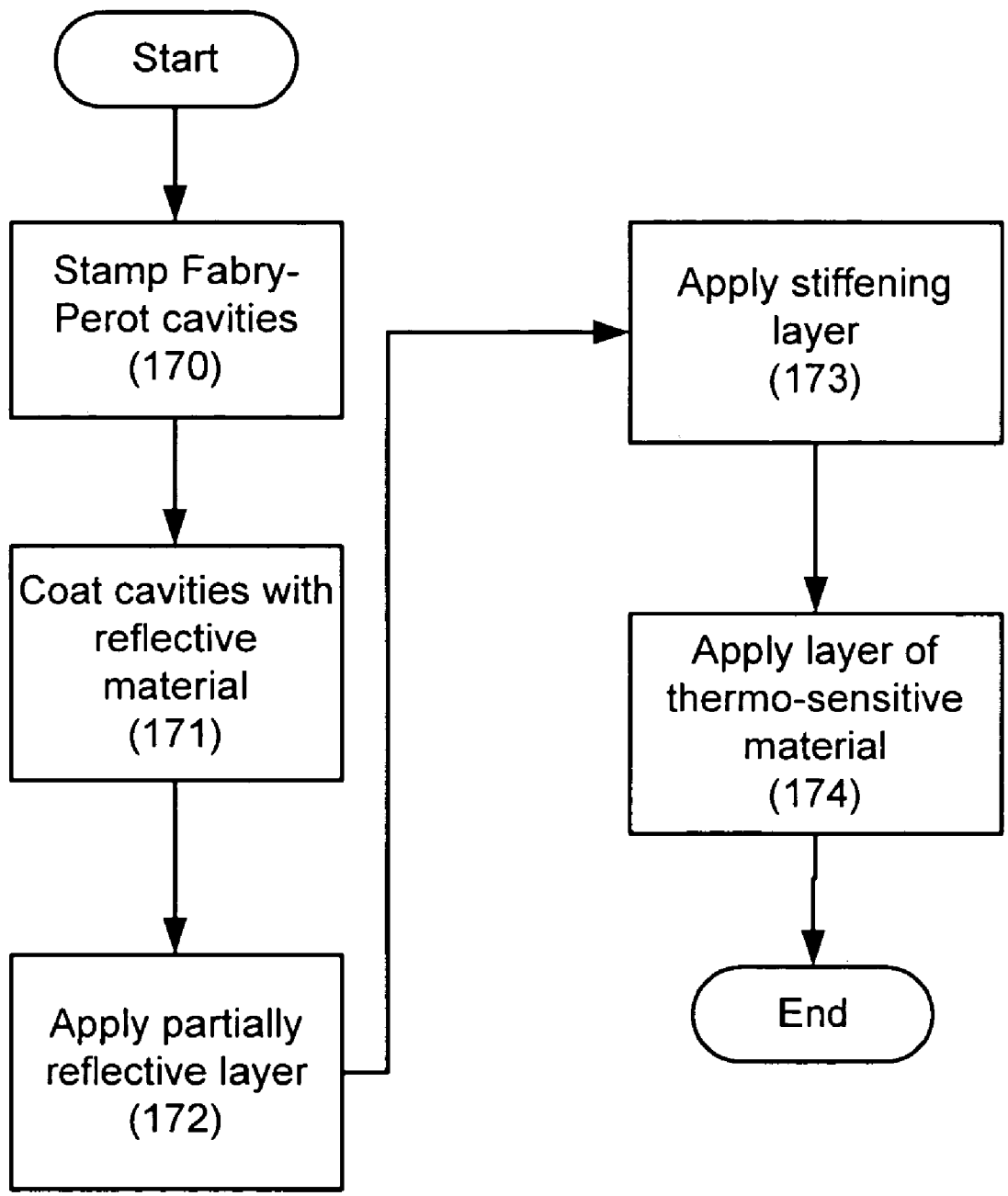
FIG. 7 is a flow chart illustrating a method of forming the optical discs of, for example, FIGS. 2 and 3, according to principles described herein.

FIG. 7 is a flow chart illustrating a method of forming the optical discs of, for example, FIGS. 2 and 3, according to principles described herein. This method substantially coincides with the various formative steps illustrated in FIGS. 4-6.

As shown in FIG. 7, first the Fabry-Perot cavities are stamped into the label side of the disc (step 170). Next, the cavities are coated with a reflective material (step 171), such as aluminum.

Next the partially-reflective layer is applied (step 172) over the Fabry-Perot cavities. This partially-reflective layer may be, for example, tantalum and aluminum (TaAl) at a thickness of 75 Å.

Then a stiffening layer is applied (step 173) over the partially-reflective layer. This layer may be, for example, polycarbonate 2 µm thick or thicker. Lastly, the layer of thermo-sensitive material is applied (step 174). The result is a thermal marking medium that can be marked with optical energy such as a laser, that has a beautiful iridescent color appearance. Images formed on the medium have a very saturated color and a unique look. The color will shift somewhat when the disk is tilted. The light reflection is specular or mirror-like and as such will look metallic and interesting to users.

The preceding description has been presented only to illustrate and describe embodiments of the invention. It is not intended to be exhaustive or to limit the invention to any precise form disclosed. Many modifications and variations are possible in light of the above teaching. For instance, while an optical disc medium has been shown and described, the thermo-sensitive Fabry-Perot medium may be a simple flat sheet suitable for photograph reproduction.

What is claimed is:

1. A medium comprising:
    a plurality of Fabry-Perot cavities of varying depths that correspond to different colors which are produced by the respective cavities under incident light; and
    a thermo-sensitive material covering said plurality of cavities, wherein said cavities are selectively exposed by heating portions of said thermo-sensitive material to alter said thermo-sensitive material where heated thereby forming an image.

2. The medium of claim 1, wherein said medium is an optical disc having a label side and a data-bearing side.

3. The medium of claim 1, wherein said medium is disposed on at least some portion of at least one of each side of an optical disc.

4. The medium of claim 1, wherein said plurality of Fabry-Perot cavities of varying depths have three different depths corresponding to Red, Green and Blue.

5. The medium of claim 1, wherein said plurality of Fabry-Perot cavities of varying depths includes a depth corresponding to Black.

6. The medium of claim 1, wherein said thermal-sensitive material is reversible.

7. The medium of claim 1, wherein said plurality of Fabry-Perot cavities of varying depth have more than three different depths.

8. The medium of claim 1, wherein said thermal-sensitive material is initially substantially transparent and can be selectively exposed to become substantially opaque.

9. The medium of claim 1, wherein said thermal-sensitive material is initially substantially opaque and can be selectively exposed to become substantially transparent.

10. The medium of claim 1, wherein said thermal-sensitive material is selectively exposed to become black.

11. The medium of claim 1, wherein at least one of the plurality of Fabry-Perot cavities is filled with a dielectric material having a refractive index different than air.

12. The medium of claim 1, further comprising a reflective material disposed in said Fabry-Perot cavities.

13. The medium of claim 12, wherein said reflective material is aluminum.

14. The medium of claim 1, further comprising a layer of partially-reflective material disposed over said Fabry-Perot cavities.

15. The medium of claim 14, wherein said layer of partially-reflective material comprises tantalum and aluminum (TaAl).

16. The medium of claim 14, further comprising a stiffening layer formed over said layer of partially-reflective material.

17. The medium of claim 16, wherein said stiffening layer comprises polycarbonate.

18. The medium of claim 1, wherein each successive cavity has a different depth.

19. The medium of claim 1, wherein a number of cavities with a same depth are grouped together.

20. The medium of claim 19, wherein each group of nine cavities contains three adjacent cavities at each of three different depths.

21. A method of forming a medium for bearing a color image, said method comprising:
forming a plurality of Fabry-Perot cavities of varying depths that correspond to different colors which are produced by the respective cavities under incident light; and
covering said cavities with a thermo-sensitive material that will become altered where heated to selectively expose or block said cavities to view and thereby form an image.

22. The method of claim 21, wherein said cavities are stamped into an optical disc.

23. The method of claim 22, wherein said cavities are stamped into a polycarbonate surface of said optical disc.

24. The method of claim 21, wherein said plurality of Fabry-Perot cavities of varying depths have three different depths corresponding to Red, Green and Blue.

25. The method of claim 21, wherein said plurality of Fabry-Perot cavities of varying depths have more than three different depths.

26. The method of claim 21, further comprising disposing a reflective material in said Fabry-Perot cavities.

27. The method of claim 26, wherein said reflective material is aluminum.

28. The method of claim 26, further comprising forming a layer of partially-reflective material over said Fabry-Perot cavities.

29. The method of claim 28, wherein said layer of partially-reflective material comprises tantalum and aluminum (TaAl).

30. The method of claim 28, further comprising forming a stiffening layer over said layer of partially-reflective material.

31. The method of claim 30, wherein said stiffening layer comprises polycarbonate.

32. The method of claim 21, wherein each successive cavity has a different depth.

33. The method of claim 21, wherein a number of cavities with a same depth are grouped together.

34. The method of claim 33, wherein each group of nine cavities contains three adjacent cavities at each of three different depths.

35. A method of forming a color image on a medium, said method comprising selectively exposing portions of said medium to heat, wherein exposed portions of said medium are altered by said exposure to selectively reveal or conceal Fabry-Perot devices under said medium which are tuned to produce certain colors under incident light.

* * * * *